Dec. 27, 1938.  S. H. A. YOUNG  2,141,833
NONMETALLIC BOTTLE CAP AND METHOD OF MAKING AND APPLYING THE SAME
Filed July 15, 1936  3 Sheets—Sheet 1
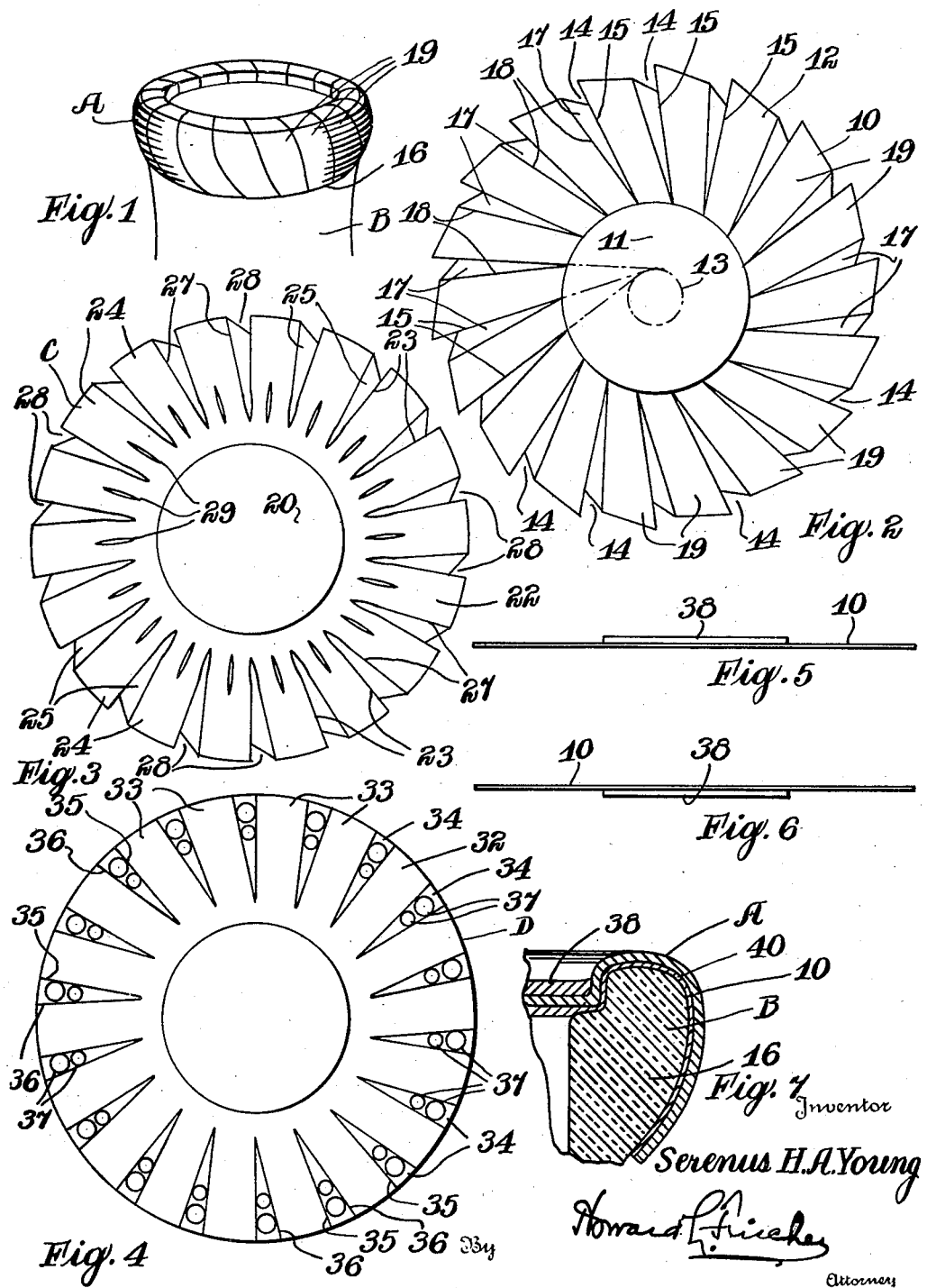

Dec. 27, 1938. S. H. A. YOUNG 2,141,833
NONMETALLIC BOTTLE CAP AND METHOD OF MAKING AND APPLYING THE SAME
Filed July 15, 1936 3 Sheets-Sheet 2
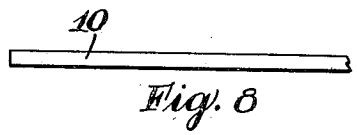
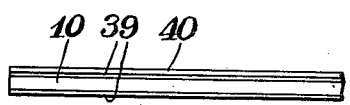
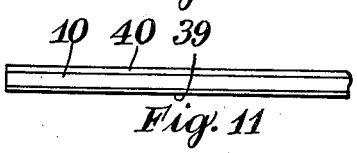
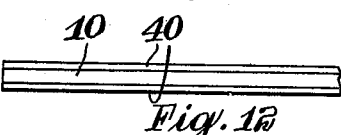
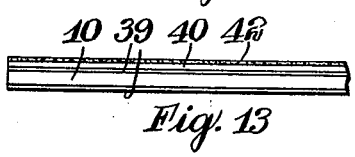
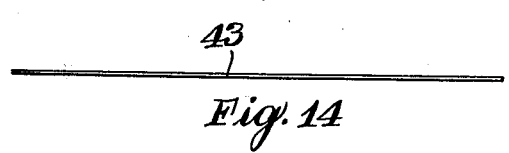
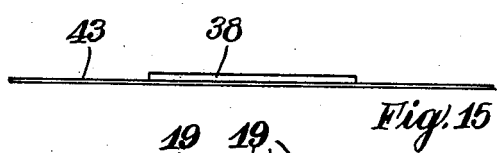
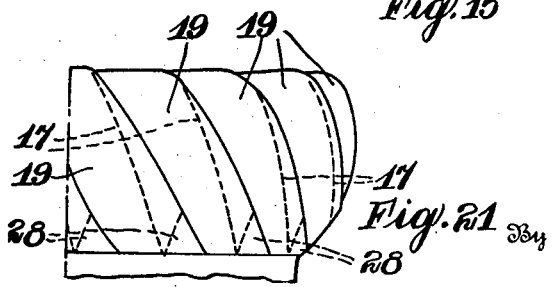
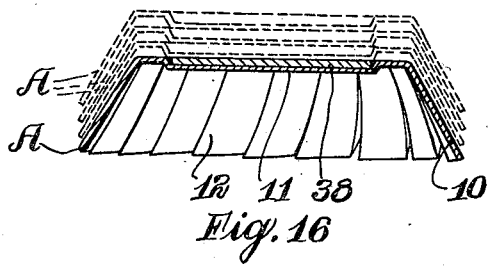
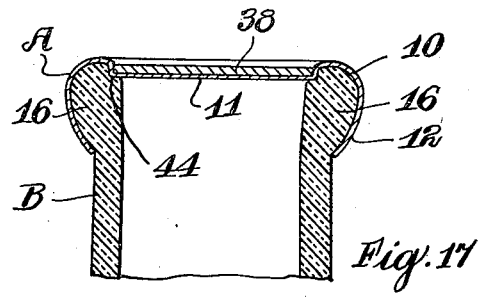
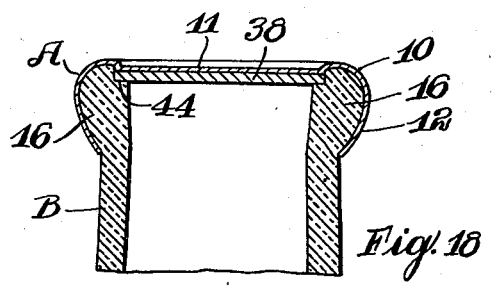
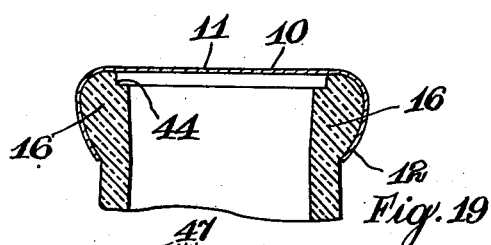
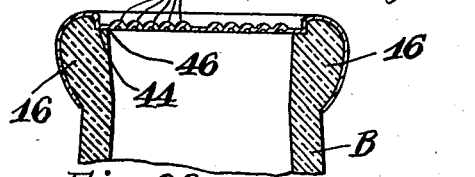
Inventor
Serenus H. A. Young
By Howard Fischer
Attorney Dec. 27, 1938.   S. H. A. YOUNG   2,141,833
NONMETALLIC BOTTLE CAP AND METHOD OF MAKING AND APPLYING THE SAME
Filed July 15, 1936   3 Sheets-Sheet 3

Inventor
Serenus H. A. Young
By Howard Fischer
Attorney

Patented Dec. 27, 1938

2,141,833

UNITED STATES PATENT OFFICE 2,141,833

NONMETALLIC BOTTLE CAP AND METHOD OF MAKING AND APPLYING THE SAME

Serenus H. A. Young, St. Paul, Minn., assignor to Young Engineering Laboratories, Inc., Minneapolis, Minn., a corporation of Minnesota Application July 15, 1936, Serial No. 90,675

10 Claims. (Cl. 93—60)

My invention relates to an improvement in bottle caps, of a type particularly adapted for covering the top and rim of bottles such as milk bottles, and to the method of manufacturing and using the same.

The usual plug top used on milk bottles has for some time been the subject of criticism, and considerable development has been made along the lines of newer, more sanitary bottle caps. Unless the pouring lip of the bottle is covered until the milk is used, this pouring lip is extremely apt to become contaminated in the delivery of the milk to the consumer. Some creameries have been using caps of a type capable of covering the pouring lip of the bottle; but as caps of this type have usually been considerably more expensive than the usual type of plug cap, such creameries have been penalized for this safeguard. In many cases the consumers have not been sufficiently educated to the advantages of such caps to realize the benefits therefrom, and accordingly are not willing to pay additional for bottles capped in this manner.

It is therefore the problem of manufacturers of caps of this nature to provide a cap which is inexpensive both to manufacture, and to use. It is extremely likely that virtually every creamery or milk producer would use such a cap if they could be bought and used for a price comparable with that of plug caps. Caps of any sort which cover the rim of the bottle are sure to cost more than plug caps; but if these caps are not much more expensive, they would be widely used.

Various caps have been designed having skirt portions extending down over the rim or bead of the bottle which are reinforced by means of a suitable metal reinforcing means, or by a band encircling the bottle. The expense of such a construction, however, narrows the field in which the cap may be sold.

It is the object of the present invention to provide a cap formed of a paper or other suitable material having a coating thereon of a material capable of acting as a bonding agent. This bonding agent is capable of adhering to itself, or, among other surfaces, those which have a wax coating or impregnation, and permits the skirt of the cap to be folded in a series of plaits, which plaits remain in folded form when once folded, to lock the cap securely in position on the bottle, but it is not intended that the coating adhere to the bottle itself.

It is a further feature of my invention to provide a cap having a series of perforations or notches cut between the various tabs, causing one tab to seal directly to the next adjacent tab rather than to a gusset portion forming a part of the fold between the adjacent tabs. These perforations or notches may be at the peripheral edge of the cap, or may be set in from the edge somewhat.

A further feature of my invention relates in providing the cap with a coating of a pressure sensitive or temperature sensitive bonding agent. This coating is not tacky at normal temperatures or pressures, and is not sticky to touch or handle. However, when pressure or temperature slightly above normal and considerably below the melting point of the coating is applied to the coating, the folds of the cap will adhere one to another, thus providing a tight seal about the top of the bottle.

Hitherto, pressure sensitive adhesives have been primarily based on the use of rubber, including suitable solvents and other ingredients to render them tacky at ordinary temperatures. The characteristics of these pressure sensitive adhesives are such that by the exertion of a slight pressure they will adhere to almost any surface. Obviously the use of such pressure sensitive adhesives in the construction of milk bottle caps would be totally impractical and unworkable for the reason that it would be literally impossible to stack the caps one upon the other in any type of container without the caps adhering to one another and preventing their easy removal from that condition to the placing of the cap upon the bottle. Furthermore, such pressure sensitive adhesives would have a strong tendency to foul the bore of the bottle as well as the bead or rim at the top, thereby making it extremely difficult to clean the bottle by the accepted method of washing bottles now generally in use, without the use of special solvents which, of course, from the commercial point of view is out of the question.

Temperature sensitive adhesives in present use are usually made from mixtures of resins and waxes. In such case, it is required that the melting point of the adhesives be approached or even reached before such temperature sensitive adhesives become effective as a bonding agent. Also, in the use of temperature sensitive adhesives of the presently known types, the parts to be adhered together would have to be physically held together until the temperature sensitive adhesive dropped in temperature to such a point as to allow the adhesive to coalesce or solidify. This is especially true where, as in the case of a plaited milk bottle cap, there is a tendency in the plait itself to open outward again to its original position during the capping operation. It is, therefore, essential that the bonding agent to be used should provide the best of the qualities of both the pressure and temperature sensitive adhesives.

Further, in the event that a water soluble adhesive were to be used, it also, when placed on the cap in the manufacturing process, would have to dry to such an extent as to prevent the sticking of the caps one to another when being stacked. Further, in the capping operation, using water soluble adhesive, the adhesive would have to be wetted prior to being placed on the bottle and that operation requires some time for the water to penetrate deeply enough into the surface of the adhesives to make it effective as a bonding agent. Furthermore, due to the fact that the water content of milk or cream is high, such an adhesive could not be used in the form I have outlined, that is, as a coating of the entire cap for the simple reason that the water present in the milk or cream would soften the adhesives and, therefore, make it ineffective. Further, such adhesives would contaminate the milk or cream. It has been often noted in the commercial operation of filling and capping milk bottles that a certain portion of the milk or cream may accidently be spilled over the lip of the bottle. This fact would prevent the water soluble adhesive from being effective. Thus it can be readily seen that water sensitive adhesives that would be used as I have outlined would not provide a tight, effective, sanitary seal, and, further, it is obvious that such an adhesive would be totally impractical due to the limitations outlined above.

The film or coating which provides my bonding agent is distinctly both temperature and pressure sensitive. It provides for the use of waxes and resins as ingredients together with rubber. While other rubber base pressure sensitive adhesives as mentioned before are tacky at ordinary temperatures, my bonding agent does not have that characteristic for the reason that the resins and waxes which are essential ingredients are solidified at ordinary temperatures and, therefore, act as a control in the degree of tackiness or stickiness possessed by my rubber base adhesive at ordinary temperatures. In other words, the solidification of the resins and waxes in my invention prevents the rubber, in the form desirable for its use as an adhesive, from exhibiting its natural characteristics of being tacky and sticky at ordinary temperatures. However, just as soon as the temperature of the adhesive as a whole is raised slightly above normal, the waxes and resins then become slightly viscous or plastic and allow the rubber to exhibit its tacky or sticky characteristics, and, therefore, to make it effective as a bonding agent.

Further, my bonding agent is effective as a temperature sensitive adherent in that, when temperature is raised sufficiently high, the waxes and resins become very plastic and less viscous and, in themselves possessing adherent properties under those conditions, the rubber content of the adherent may then act merely as a holding agent for plaits until the temperature of the adherent as a whole drops to where the resins and waxes again become solidified and, therefore, makes them effective also as a bonding agent. It can be seen, therefore, that my bonding agent possesses all the desirable qualities of both distinctly pressure and temperature sensitive adherents. As the temperature of my adherent is raised to slightly above normal and some pressure is applied, the adherent then in that condition, will adhere to waxy surfaces and the like. This feature of my bonding agent is particularly desirable because it is then merely necessary to coat one side of my cap with a continuous film because the construction of my cap in its preferred form provides for the outer surface of the cap, to be coated with wax or like materials. Furthermore my film bonding agent will not crack or separate itself from the base material of the cap when it is folded over in plaits. Heretofore moisture proofed sheets which have been used for caps would crack wherever folded, such cracking or breaking of the fibrous structure of the fibrous material taking place when only wax or like materials are used as a coating or impregnation. Thus the importance of my flexible film coating will be apparent not only as a bonding agent to seal the plaits together, but as an absolute seal at the folds or creases, my cap becomes impermeable to air and moisture.

Obviously, then, my coating will effectively prevent the cap from absorbing any of the moisture from the contents of the bottle and, therefore prevent it from becoming soggy and limp, and equally effective in keeping away from the contents of the bottle and over the surface which my cap covers any contaminating substance, either liquid or solid.

It is a further feature of my invention to provide a cap which is provided with a coating which will prevent the formation of a pad of cream on the under side thereof. The usual type of waxed plug caps have a tendency to form a thick layer of cream adhering to the bottom of the cap. My coating prevents the formation of such a layer inasmuch as it will not absorb the water present in the milk or cream and deposit the fatty solids on the under side of the cap. The coating is such that milk or cream, or moisture on the sealing surfaces will not reduce the effectiveness of the adherent when pressure or temperature is applied; but will provide a tight seal.

It is a further object of my invention to provide a means of sealing the caps upon a milk bottle simply and effectively, so that the capping operation may be quickly and inexpensively accomplished. Heretofore, the application of hood caps to milk bottles has been accomplished only by means of special expensive equipment, the cost of which is prohibitive to the small dairy. My cap provides a sanitary protection such as other caps used heretofore were unable to accomplish, and requires merely a small inexpensive capping head costing only a small fraction of the cost of other capping machines. These small capping heads may be substituted for the regular disc capping head now usually used. This change may be accomplished in a very short time and does not disturb the production schedule of the creamery. Furthermore no special skill is required to then operate the machine, as is the case with other types of capping machines. This method, together with the method of forming the cap, comprises a part of my invention.

My caps are made from a specially prepared sheet material wherein a sheet of paper is suitably moisture-proofed and wherein a flexible film of material is adhered to one side of the same to provide a coating which will not crack or break in the formation of the caps and which coating will provide an adherent to seal the cap in closed position without causing the film to adhere to the surfaces of the bottle but permitting the film to fit into the irregularities of the bottle in a manner to provide a strong and absolutely moisture-proofed cap and seal for the bottle. The sheet material prepared with this film-like coating having certain characteristics and properties which particularly adapt themselves to virtually a perfect sealing cap for a milk bottle is the subject-matter of other patent applications wherein the particular characteristics and nature of the film coated sheet are set forth and which disclose a new material not heretofore known or used. This material I have found fulfills the requirements necessary for providing an economical cap for milk bottles and the like. Any material which may be developed having these same characteristics to provide a means of making a bottle cap of the nature herein set forth and accomplishing the results desired would naturally be adaptable for my non-metallic bottle caps and method of making and applying the same. The coating in these caps has an extreme flexibility as well as a high tensile strength, whereas, adhesives used heretofore may have had the tensile strength but were utterly lacking in flexibility. Further, the coating must be absolutely free of any characteristics or nature which might contaminate or impart odors to foods and which will not support germ life.

These and other objects and novel features of my invention will be more clearly and fully set forth in the following specification and claims.

In the drawings forming a part of my specification:

Figure 1 is a perspective view of my milk bottle cap in position upon the top of a bottle.

Figure 2 is a plan view of the blank from which my cap is formed.

Figure 3 is a plan view of a modified form of blank construction for forming a slightly different form of blank.

Figure 4 is a plan view of another modified form of blank construction from which another slightly different form of blank may be made.

Figure 5 is a side view of a blank having a plug cap adhered to the upper surface thereof.

Figure 6 is a side view of a blank in which the plug cap is adhered to the lower surface thereof.

Figure 7 is a cross sectional view of a detail portion of a bottle rim and a cap illustrating the manner in which the cap coating acts as a gasket for sealing the cap to the bottle.

Figure 8 is a side view of a piece of paper from which the cap is to be formed.

Figure 9 is a side view of the paper of Figure 8 having a coating of wax impregnated on both surfaces thereof.

Figure 10 illustrates the waxed paper of Figure 9 having a coating of pressure or temperature sensitive material, or of material sensitive to both pressure and temperature.

Figure 11 illustrates a blank of paper having a coating of my coating material on one surface thereof and a wax coating on the other side thereof.

Figure 12 illustrates a blank of paper having no wax coating, but having a coating of pressure or temperature sensitive material, or pressure and temperature sensitive material on both sides thereof.

Figure 13 illustrates a paper having a wax coating, a film of coating material thereon, and a protective coating overlying the film.

Figure 14 illustrates the completed blank sheet from which the cap is formed.

Figure 15 illustrates the blank sheet of Figure 14 after the plug cap has been adhered thereto.

Figure 16 illustrates the cap after it has been pressed into shape to be nested and transported previous to the bottle capping operation.

Figure 17 illustrates in section my cap attached to the top of a bottle.

Figure 18 illustrates in section a slightly different form of cap attached to the top of a bottle.

Figure 19 illustrates in section another slightly different form of cap construction attached to a bottle.

Figure 20 shows in section still another form of cap attached to the top of a bottle.

Figure 21 shows in enlarged detail the formation of plaits in my cap when secured in position.

Figure 22:
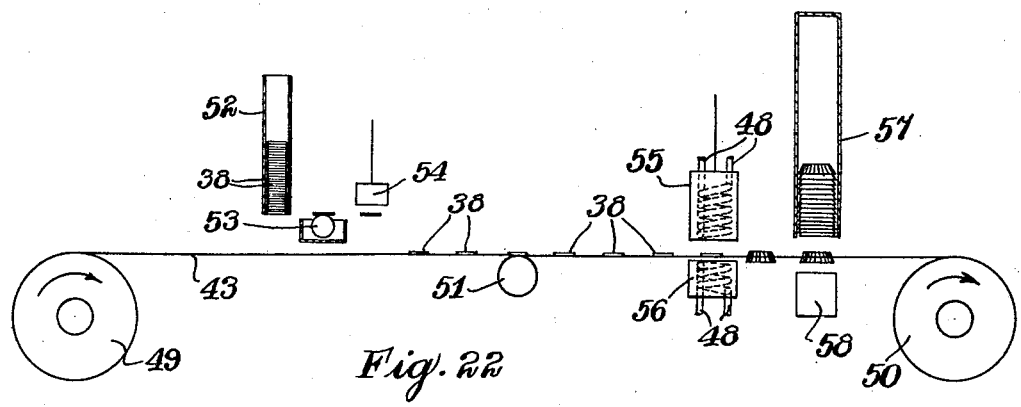
Figure 22 illustrates diagramatically the method of formation of my cap in the manufacture thereof.

My cap A is formed of a blank of prepared paper or the like. This blank 10 is formed as illustrated in Figure 2 of the drawings. The blank 10 is substantially circular in shape, and comprises a central bottle mouth covering portion 11, and a skirt 12 adapted to be folded with a series of plaits over the pouring lip of the bottle B. In preferred form illustrated in Figures 1 and 2, the plaits are formed by a series of equally spaced fold lines, which extend only substantially radially, so that each line, if extended, would be tangent to a circle 13 concentric with the cap blank 10. A notch 14 is provided adjacent each of the fold lines 15, this notch 14 being at its widest point a width equal to the difference between the actual width of the blank between plaits at this point, and the width of an equal angular segment of the bottle neck at this point.

In other words, the fold lines 15 divide the blank into a series of segments. At the outer extremity of the blank, these segments are substantially wider than necessary to encircle the bottle at the base of the rim or bead 16 thereof. The skirt portion 12 of the cap 10 must be plaited or folded to fit tightly against the bottle. The notches 14 extend the width of the folds 17 between the fold lines 15 and the fold lines 18. The outer extremity of each segment 19 is cut to provide a continuous circular line about the bottle when the cap is in proper sealed position.

When the cap A is in place upon a bottle B, the segments are wrapped spirally down over the bottle pouring lip and rim of the bottle, this spiral wrapping assisting in keeping the segments smooth. The folds 17 adhere together in a manner which will be later set forth in detail, the notches 14 permitting the inner surface of a portion of each segment 17 to directly contact a portion of the outer surface of the next adjacent segment.

In Figure 3 I illustrate a blank for a cap C being substantially similar in shape to the blank of the cap A. This cap is provided with a central mouth covering portion 20 and a skirt portion 22. The skirt 22 is provided with a series of radially extending fold lines 23 extending to the outer periphery of the blank. The skirt between the fold lines 23 is divided into a segment portion 24 and a fold portion 25, the fold portion 25 being bounded by fold lines 23 and 27 on the sides. Notches 28 extend the width of the fold portions 25 to permit a portion of the inner surface of each segment portion 24 to contact directly the corresponding portion of the outer surface of the next adjacent segment portion 24. In this construction, additional fold lines or corrugations 29 may be provided centrally in each segment portion 24 to compensate for any excessive paper at the point where the cap extends over the pouring lip of the bottle B.

Figure 4 shows a slightly different form of construction. In this figure, a blank for a cap D is provided having a central bottle mouth covering portion 30 and a skirt portion 32. The skirt 32 is folded to provide a series of segments 33 and a series of connecting plaits 34, bounded by fold lines 35 and 36. Openings 37 are provided through the folds or plaits 34, to permit the inner surface of one segment to contact a portion of the outer surface of the next adjacent segment 33.

In the usual form, the blank, such as 10 is provided with a plug cap 38 adhered to one surface thereof to seal the top of the bottle. The cap 38 may be adhered to the upper surface of the cap blank, as illustrated in Figure 5, or may be secured to the bottom thereof, as shown in Figure 6.

In preparing the paper for formation of the cap blank, a coating of wax is usually impregnated into both surfaces of the blank, as shown in Figure 9 of the drawings. Upon this blank having wax coatings 39 thereon, I provide a coating 40 of sealing material. This material is formed of pressure sensitive or temperature sensitive bonding material, or material which is both pressure and temperature sensitive. Such a material is composed of rubber modified by the use of resins and waxes. A commercial product of this type is odorless and will not impart any odor or taste to the milk. Such a material also has the property of preventing the formation of a film of hard cream or milk upon the bottom of the cap.

My film coating can be handled readily and is not tacky at ordinary temperatures and pressures. However, when a reasonable pressure is exerted between two surfaces of the material, the surfaces will readily adhere together, and become sealed. The same result may be accomplished through the use of temperatures slightly above normal. In practice, the plaits are sealed together by the use of a combination of pressure and temperature.

The advantages of such a film may be readily observed. By the use of such a bonding agent, a cap may be formed coated with a protective covering. The cap may be folded or plaited in any desired manner, and may be sealed by merely heat or pressure. The contacting portions are unaffected. The coating will not adhere to glass; but the application of pressure or higher than normal temperature will cause the coating to fit closely about the glass and to act as a gasket to seal the joint between the glass and the cap. The coating is unaffected by moisture or milk or cream upon the sealing surface.

As the film coating as described will adhere to waxy surfaces, it is only necessary to coat one side of the paper with the film if the other side of the paper is coated with wax. Figure 10 shows a wax coated paper having a coating of the film on one side only. This film could just as well be on both sides in this form. Figure 11 shows a film coating on one side of a paper, with a wax coating on the other side. Figure 12 shows a paper coated with the film on both sides. In Figure 13, the paper is coated with wax and is provided with a film of coating. A protective coating of mica dust, starch, flour, or other harmless material may be provided, as at 42, to prevent adherence between adjacent caps when stacked or nested in large piles, or in case abnormal temperatures are experienced in some manner between the manufacture of the caps and the use thereof.

The construction of the cap may be seen from Figures 14 through 17 of the drawings. Figure 14 shows a coated sheet 43 from which a cap such as A, C or D is to be made. Figure 15 shows the sheet 43 having a plug cap 38 adhered to the upper surface thereof. Figure 16 shows the cap A in section in partially formed state in which it is made and shipped for use in the capping operation. In this figure in dotted outline may be seen a series of superimposed caps A, showing the manner in which the caps may be stacked. The skirt portion 12 of the cap A is projecting downwardly from the central portion 11 thereof in a truncated conical formation, and the plaits or folds are in partially folded position.

In Figure 17 the cap A is shown in section in engagement with the top of a bottle B. The central portion 11 extends over the top of the bottle and into the bore or mouth of the bottle 44. To reinforce the central portion 11, the plug cap 38 adhered to or stapled to the center of the blank extends within the bore or mouth 44, acting to hold the central portion of the blank in position. The skirt 12 is wrapped tightly about the rim 16 of the bottle B, the skirt being formed in a series of plaits or folds as described. Each segment 19 overlaps the next adjacent tab and is adhered thereto, in the manner illustrated in Figure 1, and in enlarged form in Figure 21. When in this position, the coating on the under surface of the blank forms a tight seal against the bottle, acting as a gasket in the manner illustrated in Figure 7.

A similar construction is shown in Figure 18, with the exception that the plug cap 38 is formed on the under side of the blank, rather than on the top side. With this exception, the caps of Figures 17 and 18 are alike.

Figure 19 is similar to that of Figures 17 and 18, but in this figure the blank is stretched taut across the top of the bottle, and no plug cap such as in Figures 17 and 18 is used. In the construction of Figure 19, the folds hold the cap upon the top of the bottle, and the film of rubber modified with resins and waxes on the inside of the cap provides a gasket for sealing the cap upon the bottle top.

The cap E illustrated in Figure 20 of the drawings is formed in a manner similar to the formation of any of the other caps such as A, C, or D. This cap, however, is formed of slightly more rigid material, and the central portion 46 is provided with a series of concentric rings 47 which provide a resilient tendency for this central portion to spread out. The central portion 46 is accordingly held under spring tension against the side walls of the bore or mouth 44 of the bottle B.

In the formation of the caps, coated stock in a continuous sheet 43 rolls from a supply roll 49 to a waste stock roll 50. Plug caps 38 from a supply 52 pass over a gluing device 53 and are urged by a plunger 54 into contact with the sheet 48 at spaced intervals. A die 55 and complementary die 56 cuts out the blanks and forms them into the shape shown in Figure 16 of the drawings. The caps thus formed move beneath a supply tube 57 into which the caps are forced by means of a plunger 58.

The forming dies 55 and 56 are cooled by cooling means 48 to the necessary extent to prevent the coated surface from sticking to the dies due to the excessively high local pressures applied in the forming operation. As an additional preventative to sticking, the coated surface, prior to entering the dies, is coated by means 51 with a thin film of water. The water film could similarly be supplied by spraying the surface. Ordinarily the nature of this surface is such as to prevent a continuous film being formed. However, this may be attained through the addition of a slight proportion of a substance known as a wetting agent to the water. Further, when the cap is ejected from the dies, a certain amount of this thin water film adheres to the coated side of the cap which is desirable to the extent of further insuring the caps from sticking one to the other when stacked in the tube shaped magazines. This refrigeration of the dies, and the wetting of the paper, is an important feature in the formation of the caps.

Figure 23:
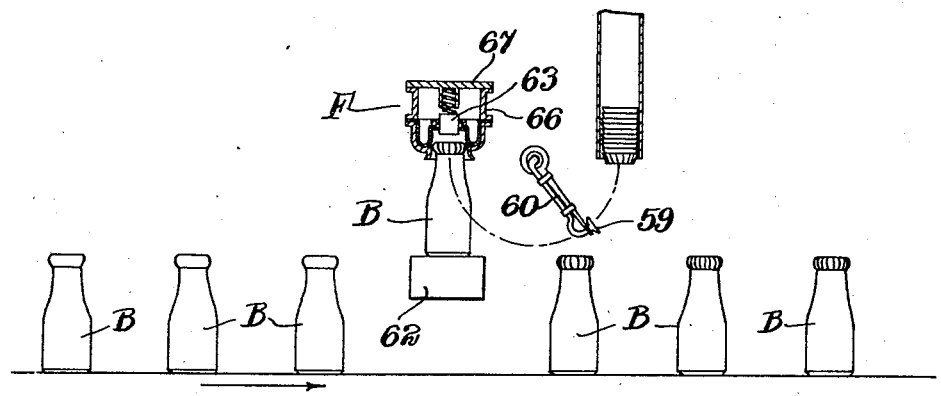
Figure 23 illustrates diagrammatically the manner in which my caps are attached to the tops of bottles.

The capping of the bottles B is diagrammatically illustrated in Figure 23. In actual practice the bottles may move in a circular path, but are shown in a straight line for purposes of illustration. The caps are removed from a reservoir supply tube 57 supporting the caps in reversed position by means of a suction cup 59 mounted on a swinging arm 60. The arm 60 moves the cap from the tube 57 into position above a bottle B. The bottle capping plunger mechanism 62 delivers the cap to the bottle B by moving the bottle upwardly into the cap. The bottle then continues its upward motion coming in contact with a plunger 63 which fits the bore of the bottle. As this action continues upward the plunger which then reaches a mechanical limit, the stop 64, forces the center portion of the hood cap into the bore of the bottle forming an effective seal.

Figures 24, 25:
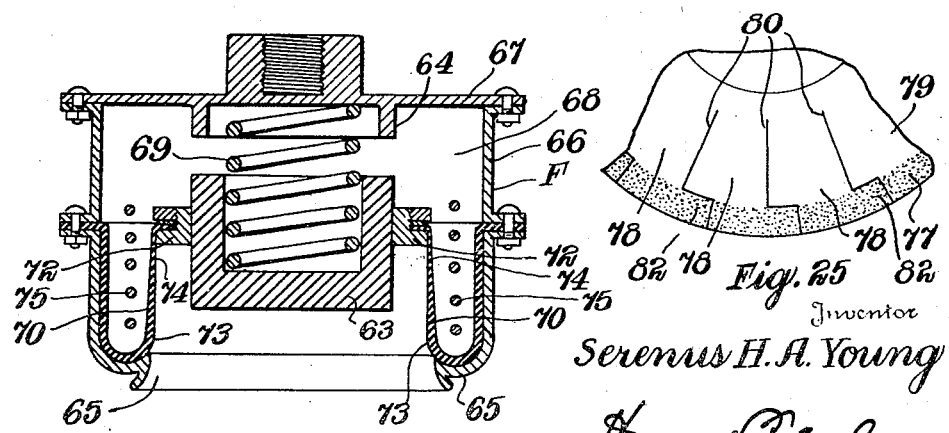
Figure 24 illustrates sectionally the formation of my capping means for securing the cap on the bottle.
Figure 25 shows another form of cap construction.

The capping mechanism F is best illustrated in Figure 24. This mechanism comprises an annular guiding lip 65 which slides down over the skirt of the cap as the bottle moves into contact with the capping means F. A casing 66 is secured to, and supports the lip 65 depending therefrom. A capper top 67 closes the upper end of the casing 66. Slidably mounted within the casing, and spaced from the walls thereof to provide a chamber 68, I provide the plunger 63, normally spaced from the top 67 by a spring 69. A liner 70 which is expansible and contractable, and is preferably made of rubber or some other material having similar properties, is secured between the outer wall of the casing 66 and the plunger guide 72. This liner 70 is formed with thicker walls at its lowermost extremity 73 as shown, than adjacent the top 74 thereof. This permits the expansion of the liner 70 to take place first at the top thereof, adjacent the pouring lip of the bottle inserted within the capper F, and then to permit expansion below the lip of the bottle B, the liner pressing the cap to the bottle rim progressively from the pouring lip thereof down to the extreme edge of the cap skirt. A heating coil 75 within the casing 66, or in the chamber 68, heats liquid therein, thus heating the liner 70 above normal temperatures.

As the bottle B moves upwardly in the capping mechanism F, a portion of the skirt of the cap is drawn uniformly in over the pouring edge. After this portion of the skirt is drawn in over the pouring lip of the bottle, a section of the radial plaits close up, forming narrow ridges over the pouring lip of the bottle. The step of drawing the cap into the bore of the bottle actually fits the cap to the bottle rim, regardless of the shape of the rim. The same size and shape of cap may accordingly be used for all milk bottles.

Just before the plunger 63 of the capping head F forces the center portion of the cap into the bore of the bottle, the substantially hollow rubber ring or liner 70 which forms a part of the capper F encloses the skirt portion of the cap as it moves upwardly under slight pressure. As the plunger 63 moves upwardly, the liquid within the chamber 68 is forced to expand the rubber liner, moving through the heating element 75. By the time the bottle B reaches the top of its upward movement, the heated liquid has caused the ring or liner 70 to expand, progressively pressing the cap against the rim of the bottle, the pressure and above normal temperatures producing a tight bond or seal, and completing the capping operation.

The cap illustrated in Figure 25 differs from the other caps in that it is provided only with an annular ring of bonding material 77 extending peripherally about the same. This cap is formed in a series of segments 78 in the skirt 79, each segment being bounded by a substantially radially extending line 80 and a projecting portion 82 which is formed to overlap the next adjacent segment and to adhere thereto.

The heating element for the capping head may be formed on the swinging arm 60 if desired rather than upon the capping head itself. Such an element could be mounted adjacent the skirt of the cap being carried by the arm 60, to heat the skirt of the cap during the conveyance of the cap.

In this manner a seal of high bonding strength with respect to wax is provided through the use of temperatures slightly above normal, and by application of pressure. Either of these forces alone would suffice to provide a good seal.

If desired, spaced plaits about the circumference of the cap could be sealed during the formation of the cap into the shape shown in Figure 16 of the drawings. If, for example, every second, third, or fourth plait were sealed at this time, the cap would be held in proper form until its use in the capping device to seal a bottle.

In accordance with the patent statutes, I have described the principles of operation of my bottle cap, the method of forming the cap, and the method of capping bottles therewith. While I have endeavored to set forth the best embodiments thereof, I desire to have it understood that this is only illustrative of a means of carrying out my invention and that obvious changes may be made within the scope of the following claims without departing from the spirit of my invention.

I claim:

1. The method of forming bottle caps which comprises coating a sheet of flexible material with an adhesive composition which is non-tacky at normal temperatures and pressures and which is adhesively sensitive at temperatures slightly above normal but distinctly below the melting point of the said composition, cutting from said sheet blanks comprising a top and skirt portion and pressing the said blanks into a truncated conical shape having a plaited skirt portion.

2. The method as in claim 1, wherein the adhesive is a composition comprising rubber and wax.

3. The method of forming bottle caps which comprises coating a sheet of flexible material with an adhesive composition which is non-tacky at normal temperatures and pressures and which is adhesively sensitive at temperatures slightly above normal but distinctly below the melting point of the said composition, applying to said sheet at spaced intervals plug caps, cutting from said sheet blanks comprising a top and skirt portion, the said plug caps being at the center of the top portion, and pressing the said blanks into a substantially truncated conical shape with the said plug cap centered at the apex.

4. The method of forming bottle caps which comprises coating a sheet of flexible material with an adhesive composition comprising rubber and wax which is non-tacky at normal temperatures and pressures and which is adhesively sensitive at temperatures slightly above normal but distinctly below the melting point of the said composition, cutting from said sheet blanks comprising a top and skirt portion and pressing the said blanks into a truncated conical shape having a plaited skirt portion, in dies which are cooled to a temperature at which the adhesive composition is not adhesively sensitive at the contact surface of the dies.

5. The method of forming bottle caps which comprises coating a sheet of flexible material with an adhesive composition which is non-tacky at normal temperatures and pressures and which is adhesively sensitive at temperatures slightly above normal but distinctly below the melting point of the said composition, applying to said sheet at spaced intervals plug caps, cutting from said sheet blanks comprising a top and skirt portion, the said plug caps being the center of the top portion, and pressing the said blanks into a truncated conical shape, in dies which are cooled to a temperature at which the adhesive composition is not adhesively sensitive at the contact surface of the dies, the said plug caps being centered at the apex portion of the respective truncated cones.

6. The method of forming bottle caps which comprises coating a sheet of flexible material with an adhesive composition which is non-tacky at normal temperatures and pressures and which is adhesively sensitive at temperatures slightly above normal but distincty below the melting point of the said composition, cutting from said sheet blanks having a top and skirt portion, and pressing said blanks into a truncated conical shape having a plaited skirt portion, in dies cooled to a temperature at which the adhesive composition is not adhesively sensitive at the contact surface of the dies.

7. The method which comprises forming, from a sheet of flexible material coated with an adhesive composition comprising rubber and wax which is non-tacky at normal temperatures and pressures and adhesively sensitive at temperatures slightly above normal but distinctly below the melting point of the said composition, a generally circular bottle cap blank with V shaped notches in its periphery, folding said blank to form a cap of substantially truncated conical shape having a plaited skirt portion, the notches extending into the plaited folds.

8. The method of producing bottle caps consisting in cutting the caps from a sheet of flexible material coated with an adhesive composition which is non-tacky at normal temperatures and pressures and which is adhesively sensitive at temperatures slightly above normal although distinctly below the melting point of the said composition, partially forming the caps in one operation and completing the formation of the said caps in the second operation as they are applied to the bottle, the said second operation comprising pressing the skirt portion of the cap to fit the outer contour of the bottle rim, thereby causing the successive segments at their end portions to overlap and adhere to each other, the pressing temperature being sufficient to render the adhesive sensitive.

9. The method which comprises forming a partially formed cap from a sheet of flexible material coated with an adhesive composition comprising rubber and wax and which is non-tacky at normal temperatures and pressures and adhesively sensitive at temperatures slightly above normal but distinctly below the melting point of the said composition, a generally circular bottle cap blank with V shaped notches in its periphery, folding said blank to form a cap of substantially truncated conical shape having a top portion and a plaited skirt portion with notches extending into the plaited folds, applying the top of the said partially formed cap to the top of a bottle directly over the bottle bore, pressing the said top portion into the said bore while shaping the skirt over the rim of the bottle at a temperature sufficient to render the adhesive composition sensitive, thereby causing the skirt portion of the cap to assume a snug fit of the bottle contour, each successive segment of the skirt portion overlapping the adjacent segment and adhering to it and thereby completing said cap.

10. The method of forming bottle caps made of a partially shaped sheet of flexible material coated with an adhesive composition which is non-tacky at normal temperatures and pressures and which is adhesively sensitive at temperatures slightly above normal but distinctly below the melting point of the said composition, said sheet being preformed into substantially truncated conical shape having a top portion and a skirt portion which comprises pressing the partially shaped sheet on the top of a bottle, pressing the central portion of said shaped sheet into the bore of said bottle and pressing the skirt portion of said partially shaped sheet against the rim of said bottle to assume the shape of said rim, the pressing temperature being sufficient to render the adhesive composition sensitive.

SERENUS H. A. YOUNG.